Dec. 18, 1956  R. T. McCOY  2,774,146
DIRECT-READING HEIGHT GAUGE
Filed July 15, 1954
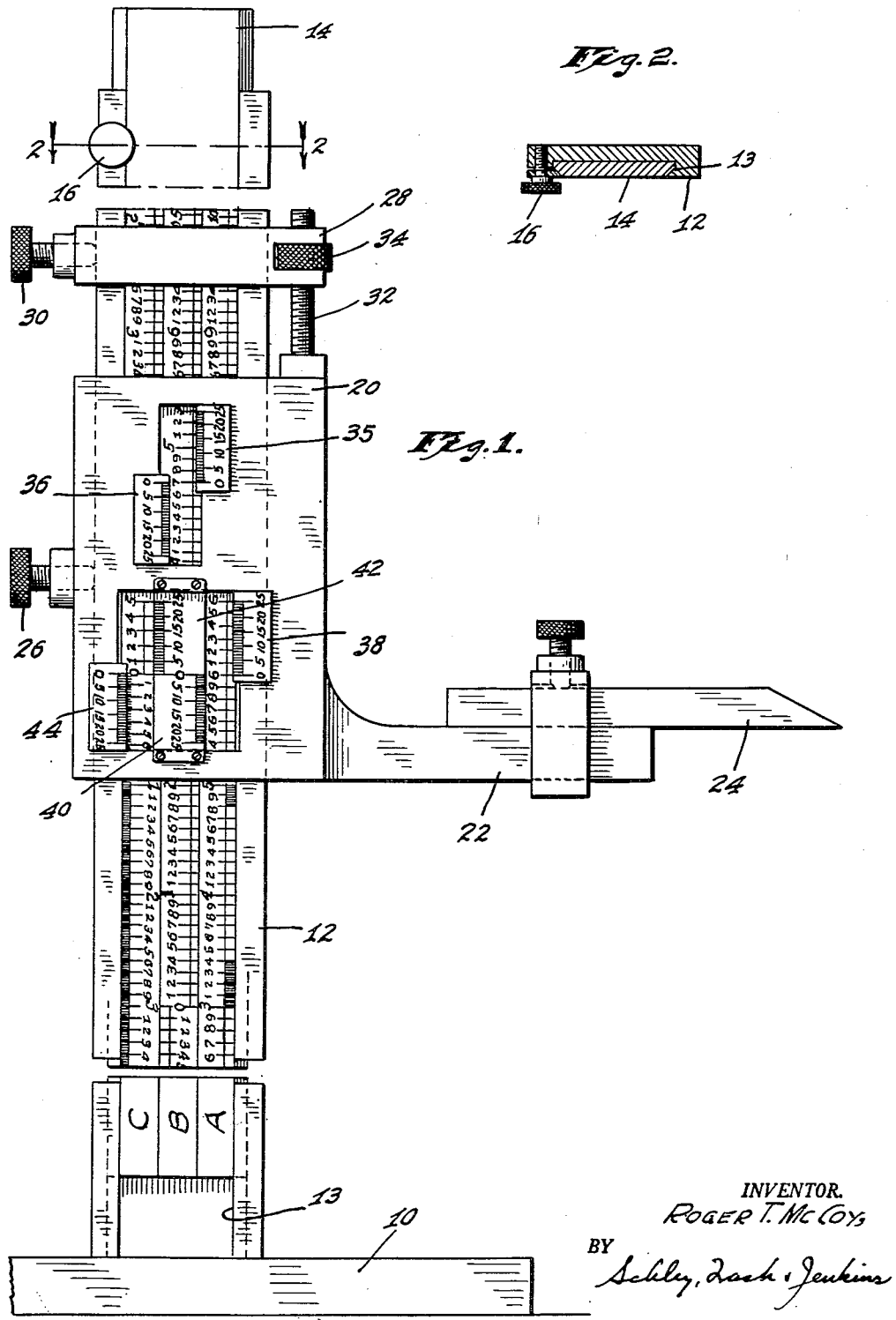
INVENTOR.
ROGER T. McCOY,
BY
Schley, Lash & Jenkins
ATTORNEYS.

United States Patent Office 2,774,146
Patented Dec. 18, 1956

2,774,146

DIRECT-READING HEIGHT GAUGE

Roger T. McCoy, Indianapolis, Ind.

Application July 15, 1954, Serial No. 443,671

2 Claims. (Cl. 33—169)

This invention relates to a height gauge in which distances above or below a selected and variable reference level or point can be laid out or read directly.

It is an object of the invention to provide an improved height gauge of simple construction, adapted for use in making a wide range of gauging measurements, which may be readily adjusted to bring the zero point of a selected scale to a desired reference level and which will provide direct reading measurements of distances from that reference level. It is an object of the invention to provide such a height gauge in which both upward and downward distances from the reference level may be directly read or measured without resetting the gauge; and one which has a plurality of selectively useable scales with their zero points at different positions and which give different ranges of measurements upward and downward from the selected reference level.

In accordance with the invention, an upright standard mounted on a suitable base is provided with a vertically slidable rule which may be locked in vertically adjusted position. The rule carries at least one scale, and desirably a plurality of scales. Each scale or set of scales desirably extends both upward and downward from a zero point, and the several scales are longitudinally displaced with respect to each other, with their zero points located at suitably spaced points along the rule, the spacing being selected with reference to the size of the rule and the ranges of measurements desired. A scribe-supporting saddle is carried by the gauge for vertical adjustment along the rule, and is provided with suitable reading indicia, preferably vernier scales, in co-operative relationship with the upward and downward portions of the scale or scales on the rule. A single saddle is used, and the pointer or scribe which it carries relates its position to the work which is to be gauged.

In a preferred method of use, the saddle is adjusted to bring its scribe to a selected reference level or point. The adjustable rule is then adjusted to bring the zero point of one of its scales into alignment with the related zero-indicia on the saddle, and the rule is then locked in this adjusted or calibrated position. The saddle is then released from its reference or zero position, and may be freely moved upward and downward with respect to the rule, along the selected and calibrated scale, to measure or lay out distances both upward and downward from the established reference level. The distances from the reference level or point to the other points on the work to which the scribe or pointer is moved, can be read directly from the calibrated scale or scale set, with no need to make calculations of distances from a previously determined intermediate point on a fixed scale.

The accompanying drawing illustrates the invention. In such drawing:

Fig. 1 is a front elevation of a height gauge embodying my invention; and

Fig. 2 is a section taken on the line 2—2 of Fig. 1.

The height gauge shown in the drawing comprises a base 10 which supports a vertical standard 12 of generally rectangular cross section and with a wide dove-tail groove 13 in its front face. A rule 14 is slidably mounted in the groove 13. Adjacent the top of the standard 12, one of its edges is slotted to provide a flexible wall which can be pinched against the rule by a thumb-screw 16 to lock the rule 14 in adjusted position.

The rule may carry one or more sets of scales, and I desirably provide three sets of scales, A, B, and C. Each set of scales desirably has a single zero point, and two oppositely running scales, one running upward and the other running downward from the zero point. The three sets of scales are longitudinally displaced with respect to each other. In an 18-inch gauge, for example, the zero points may be spaced by distances of about three inches. As shown, the zero point on the B scale is opposite the 3-inch mark on the A scale, and the zero mark on the C scale is opposite the 6-inch mark on the A scale. The three scales are selectively usable, depending upon the range of measurements it is desired to make.

The standard 12 carries a longitudinally adjustable saddle 20 which has a projecting arm 22 to support a scribe or pointer 24. A thumb screw at the opposite side of the saddle 20 is operative to lock the saddle in adjusted position.

Desirably, the saddle 20 is provided with a fine-adjustment mechanism, which may comprise a collar 28 carried by the standard 12, with a set screw 30 to lock it in adjusted position. The collar 28 is connected to the saddle 20 by a screw 32 and a manually adjustable nut 34. With the collar locked in position, adjustment of the nut 34 will give a fine adjustment of the position of the saddle 20.

The saddle 20 carries scale-reading indicia for the three scales A, B, and C of the rule 14. Preferably and as shown, these are vernier indicia. The vernier 35 is positioned in co-operative relationship with the upward extending portion of scale B, and the vernier 36 is positioned in operative relation with the downward extending portion of scale B. The verniers 38 and 40 are respectively associated in co-operative relationship with the upward and downward extending portions of scale A, and the verniers 42 and 44 are respectively associated with the upward and downwardly extending portions of scale C.

The height gauge may have its rule 14 locked in any position of adjustment, and any of the scales A, B, or C may be used in the ordinary way. That is, the saddle 20 will be adjusted to bring the scribe 24 to a first point, and a reading on one of the scales will be taken at that point; the saddle 20 will then be moved to a second point, and a second reading taken at that point; and the first reading will be subtracted from the second reading to give the distance between the two points.

The preferred and advantageous method of use of the improved height gauge is as follows: The gauge is supported at a suitable height on a flat base-plate beneath or adjacent the work. The saddle 20 is adjusted vertically to bring the pointer or scribe 24 to a selected reference point or level. The rule 14 is then adjusted to bring the zero point of one of its scales A, B, or C into alignment with the zero point of the reading indicia carried on the saddle for that scale. The rule 14 is then locked in this position, by means of the thumb screw 16. The selected scale will now have its zero point in fixed relation to the reference point on the work and the selected scale will be calibrated for direct measurements from the reference level. Measurements are then made, upward or downward, by subsequent movement of the saddle to carry its scribe 24 to the points which it is desired to gauge—with such movement of the gauge over the baseplate as may be necessary. The vertical distances of the gauged points from the reference level will be read directly from the selected scale. Measurements can be made both upward and downward from the reference point, without re-setting the rule 14. There will be no need for any arithmetical computation, and the danger of errors from that computation will be avoided.

The scale which is selected for use in any particular set of measurements will be selected on the basis of the range of measurements which are contemplated. Thus, if a wide range of upward measurements is to be made, the scale is selected which has its zero point displaced downwardly from the other scales, in this case the scale A. On the other hand, if a wide range of measurements is to be made downward from the reference point, scale C would be used, since its zero point is displaced upwardly and a greater length of downward scale is available.

I claim as my invention:

1. A direct-reading height gauge, comprising a base, a vertical rule adjustably carried by the base and carrying a plurality of scale-sets each having a pair of scales running upward and downward from a common zero point, with the zero points of said scale-sets at spaced points along the rule, means to secure the rule in adjusted position with its zero points at selected reference heights from the base, and a scribe-supporting saddle carrying reading indicia for each of said scales of said sets and cooperatively related thereto, said saddle being vertically movable with respect to the rule to carry said indicia in scale-reading relation both upward and downward along the scales from the zero points with the rule secured to adjusted position as aforesaid.

2. A direct-reading height gauge, comprising a base, a vertical standard thereon, a rule carried by the standard for longitudinal adjustment with respect to the base, said rule carrying a scale-set having a zero point and a pair of scales running upward and downward therefrom, a scribe-supporting saddle movable longitudinally with respect to the rule, said saddle carrying reading indicia cooperatively related to said scales, means to secure said saddle at a selected reference height, means to secure the rule in calibrated position with its zero point aligned with said saddle indicia and thereby fixedly relate the scale zero point to the reference height, said saddle being subsequently movable both upward and downward along the rule from said zero point to give direct-reading measurements of distances from said reference height, said rule also carrying one or more longitudinally displaced scales each having a zero point, and said saddle also carrying reading indicia for each of said additional scales, said rule being adjustable to bring the zero point of each additional scale into calibrated alignment with its reading indicia, whereby said rule provides a plurality of selectively usable scales to give different ranges of measurement from a selected reference height.

References Cited in the file of this patent

FOREIGN PATENTS

| 26,318 | Great Britain | Dec. 2, 1903 |
| 118,593 | Great Britain | Apr. 10, 1919 |
| 83,068 | Switzerland | Apr. 1, 1920 |